US006266069B1

(12) United States Patent
Thagard et al.

(10) Patent No.: US 6,266,069 B1
(45) Date of Patent: Jul. 24, 2001

(54) PICTURE FRAME WITH ELECTRONIC AND MOVING IMAGES

(75) Inventors: Gregory B. Thagard, Los Angeles; John H. Dargan, Palos Verdes Estates; Randolph M. Blotky, Los Angeles, all of CA (US)

(73) Assignee: Time Warner Entertainment Co., LP, Burbank, CA (US)

( * ) Notice: Subject to any disclaimer, the term of this patent is extended or adjusted under 35 U.S.C. 154(b) by 0 days.

(21) Appl. No.: 09/286,414

(22) Filed: Apr. 5, 1999

(51) Int. Cl.$^{7}$ .............................. G06T 11/60; G09G 3/32; G09G 3/36

(52) U.S. Cl. ................................ 345/435; 345/83; 345/88

(58) Field of Search .................................... 345/1, 82, 83, 345/84–98, 435; 348/790; 358/1.18

(56) References Cited

U.S. PATENT DOCUMENTS

| | | | | |
|---|---|---|---|---|
| 4,614,668 | * | 9/1986 | Topp et al. | 427/66 |
| 4,754,271 | * | 6/1988 | Edwards | 345/98 |
| 5,442,374 | * | 8/1995 | Koizumi | 345/110 |
| 5,459,819 | * | 10/1995 | Watkins et al. | 395/117 |
| 5,629,796 | * | 5/1997 | Shanks | 359/463 |
| 5,815,645 | * | 9/1998 | Fredlund et al. | 395/117 |
| 5,963,214 | * | 10/1999 | Cok et al. | 345/435 |

OTHER PUBLICATIONS http://www.cdtltd.co.uk/seikotvtech.htm, printed Feb. 8, 2001; The Plastic Television; 2 pages.*

4.4L: Late–News Paper: Ink–Jet Printing Technology & it's Application in Polymer Multicolor EL Displays, 1998 SID; UCLA, Los Angeles, California USA; by Y Yang, J Bharathan; ISSN0098–09*66Z/98/2901; 3 pages.

http://www.cdtltd.co.uk/techbckgrnd.htm, printed Jan. 29, 2001; Light Emitting Polymers Technology Backgrounder—Electronic Polymers; 6 pages.

http://www.eet.com/story/OEG19990210S0057 printed Jan. 29, 2001; Light–emitting polymer leaps to full color; by David Lieberman (EE Times Feb. 10, 1999, 3:04 pm EST); 2 pages.

http://www.cdtltd.co.uk/sidpaper.htm printed Jan. 29, 2001; Light Emitting Polymers–Technology for conformable Graphic Displays; by Paul May (Tech. Director, CDT Ltd), First presented at the Society for information Display Conference, San Diego, California USA, May 1996; 8 pages.

International Electron Devices Meeting (IEDM Technical Digest), Dec. 5–8, 1999, Washington DC, USA; Technology for Active Matrix Light Emitting Polymer Displays; by T Shimoda, M Kimura, S Seki, H Kobayashi, S. Kanbe, S Miyashita, Seiko Epson Corp. Jagano–ken 3928502 Japan; pp. 107–110.

* cited by examiner

*Primary Examiner*—Bipin Shalwala
*Assistant Examiner*—Jeff Piziali
(74) *Attorney, Agent, or Firm*—Gottlieb, Rackman & Reisman, P.C.

(57) ABSTRACT

A picture frame that can be used to exhibit regular objects such as photographs or other art works, as well as electronic images, including still and moving images. The frame includes a base, and a border forming a window through which a display area is visible. Electronic displays are attached to the base and/or the border, and a control circuit generates signals for the displays to display various images. The displays can be either color LCD devices or light emitting polymer devices. Imaging data for the displays is stored in an internal or replaceable memory.

23 Claims, 2 Drawing Sheets

PICTURE FRAME WITH ELECTRONIC AND MOVING IMAGES

BACKGROUND OF THE INVENTION

A. Field of Invention

This invention pertains to an improved picture frame that can be used selectively to display one or more still or moving electronic images. More particularly, the invention pertains to a picture frame having a picture display area surrounded by a border. Electronic displays are provided in the picture display area and/or the border for displaying of still or moving images.

B. Description of the Prior Art

Picture frames for displaying images are well known in the art. Depending on their size and structure, picture frames either are free standing or can be hung on a wall. Some frames can even be used either way. Typically, these frames are used to display various images, including photographs, paintings and other artistic creations.

A standard picture frame includes a base that forms a picture display area, the base usually being made of a relatively stiff material. To protect the object being displayed and to enhance its visual and esthetic effect, a border is often provided around the display area secured to the base. This border may consist of a sheet of paper, cardboard or other material. Frames are often made or finished with decorative designs that are very ornate.

A disadvantage of a standard picture frame is that it is constructed and arranged to display only a single object and its border is static in the sense that changing it is either impossible or very difficult.

Various devices are also available for displaying a plurality of pictures. One such device is formed in the shape of a drum with a plurality of individual jackets coupled to a center shaft, each jacket holding one or two pictures. Rotating the shaft allows a viewer to see the pictures in sequence. Another device capable of displaying several pictures includes a closed housing with a viewing window. A mechanical member inside the housing is manipulated to cause pictures within the housing to be moved to the window for viewing. Both of these latter devices are cumbersome to load and to operate. Moreover, these devices again have only a static border, if any, which cannot be changed.

A further problem with existing picture frames is that they cannot be used to display digital images directly. In the past few years, digital photography has become very popular. Some experts believe that in the near future, this technology will completely replace standard photographic techniques based on chemical imaging. Pictures taken with digital cameras are stored as digital data. A major advantage of these pictures is that, since they are stored digitally, they can be manipulated easily to correct various imperfections, to add new esthetic effects or to change portions of the pictures and even their colors. However, until now, digitally generated pictures could be displayed and viewed only in two ways: they could be displayed directly on the monitor of a computer or hard copies could be printed. The first method requires the use of a computer. The second method is not practical, except in commercial applications, because photographic quality printers and papers are expensive. Moreover, once printed, pictures can be displayed only by using a standard frame of the kind discussed above.

OBJECTIVES AND SUMMARY OF THE INVENTION

An objective of the present invention is to provide a picture frame constructed and arranged to display either still or moving digital images.

A further objective is to provide a picture frame that can selectively be used to display either a standard picture or other graphic artwork or an electronic image.

Yet another objective is to provide a picture frame with a dynamic border on which various still or moving images can be generated at will.

Other objectives and advantages of the invention will become apparent from the following description of the invention.

Briefly, the subject picture frame consists of a base having a top surface, at least partially covered by an active main display. Attached to the base is a border extending generally along the periphery of the base and defining a window through which the main display is visible. A transparent cover may be mounted on top of the base and attached to the border. A pocket is thus formed between the base and the border. A standard picture or other art work can be slipped or otherwise inserted into this pocket so that it rests on the base and is visible through the window.

The border also has an outer surface having with one or more border displays. Various still and moving images can be selectively displayed on the border displays, the images comprising ornamental designs, and/or alphanumeric characters providing information about the image on the main display or the picture disposed in the pocket. The images displayed on the border displays can still images or moving images related to the image or picture shown by the main display.

An electronic circuit is also provided which includes a controller and a display driver. The controller generates control signals translated by the driver circuit into corresponding data signals for the main display, if an image is to be generated, and/or for the border displays . The data for the images is stored in a memory that may be a permanently installed memory or it may be a removable memory such as a flash memory card, or both.

DETAILED DESCRIPTION OF THE INVENTION

Figure 1:
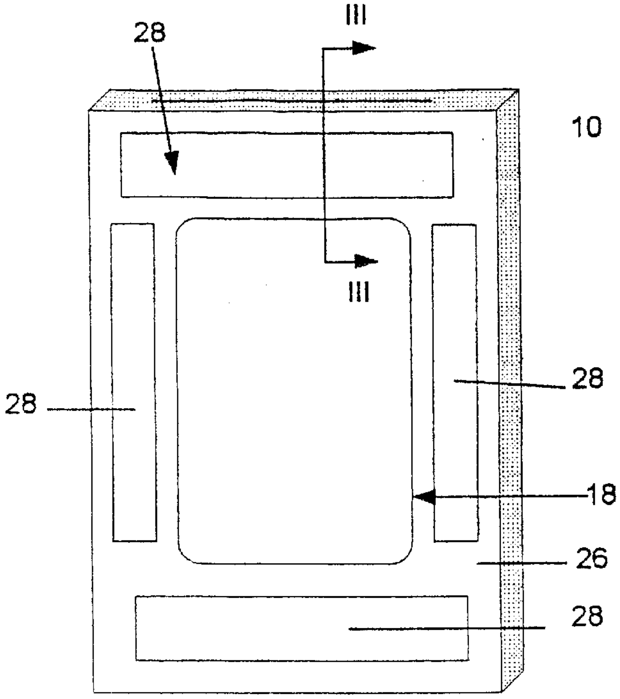
FIG. 1 shows a front view of a picture frame constructed in accordance with this invention.
Figure 2:
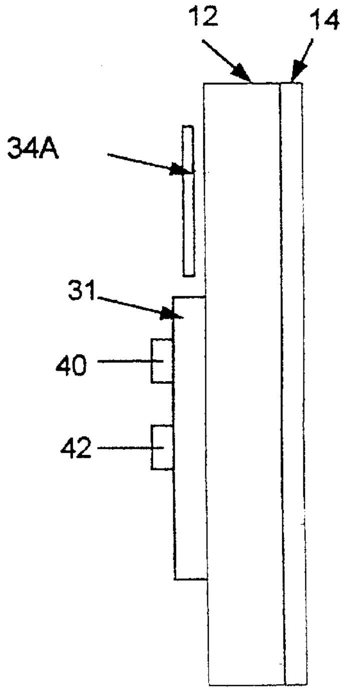
FIG. 2 shows a side view of the picture frame of FIG. 1.
Figure 3:
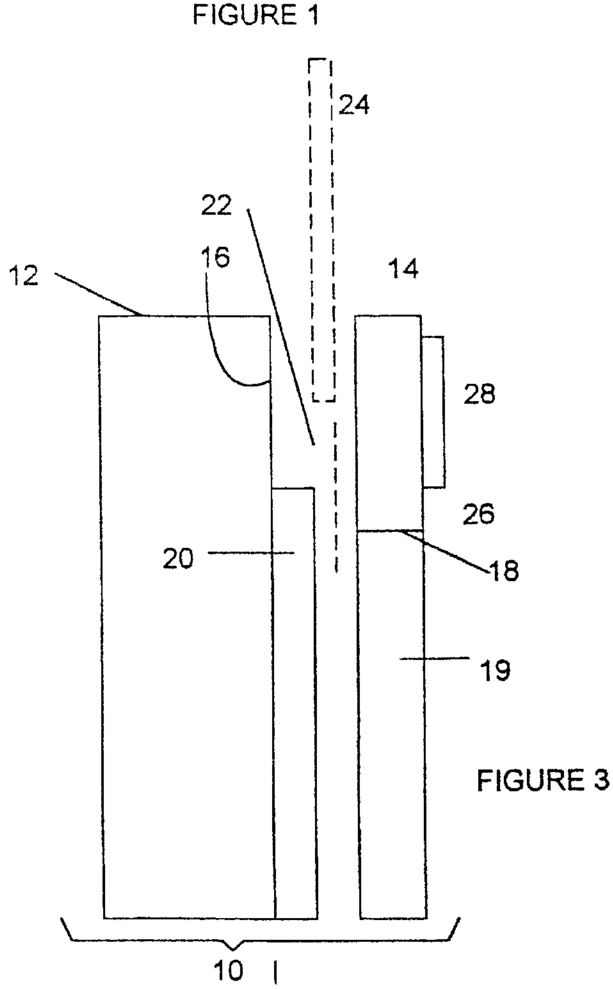
FIG. 3 shows an enlarged partial sectional view of the upper part of the picture frame of FIGS. 1 and 2 taken along line III—III in FIG. 1.

Referring now to FIGS. 1–3, a picture frame 10 is illustrated having a base 12 made of cardboard or other relatively stiff material, and a border 14 attached circumferentially to the base 12. The base 12 has an inner surface 16. Border 14 is formed with a window 18. The window may have any geometric shape desired although rectangular is preferred. A transparent cover 19 may be positioned in the window 18 and attached to the border 14 in any known manner.

In one aspect of the invention, a display 20 is mounted on the inner surface 16 of the base 12. Display 20 may be made of LCD material, such as displays available from Micro Display Corporation of Richmond, Calif. or Kopin Corporation of Taunton, Mass., or it may be a display made of a light emitting polymer (LEP), such as displays available from Cambridge Display Technology of Cambridge, United Kingdom.

A slot 22 is formed between the border 14 and the inner surface 16 to allow a picture 24 to be inserted. In such a case, display 20 is covered.

Border 14 includes a support 26 generally made of a stiff material. The border 14 is further provided with a plurality of border displays 28 mounted on the support 26. The border displays 28 are constructed in the same way as display 20. Each display 28 may be arranged so that it is coextensive with a portion of the support 26, but together all of displays 28 may substantially cover the whole support 26. Alternatively, the displays 28 may extend only partially over the support 26, as shown in FIG. 1. Of course, if desired, only one or two displays 28 may be provided on support 26, disposed, for example, along the top and/or bottom portions of the border 14.

A control circuit 30 is also provided to control operation of the displays 20 and 28. As seen in FIG. 2, the control circuit may be disposed in a housing 31 attached to the back of the base 12. Alternatively, the control circuit may be imbedded in base 12, support 26, or any other portion of frame 10.

Figure 4:
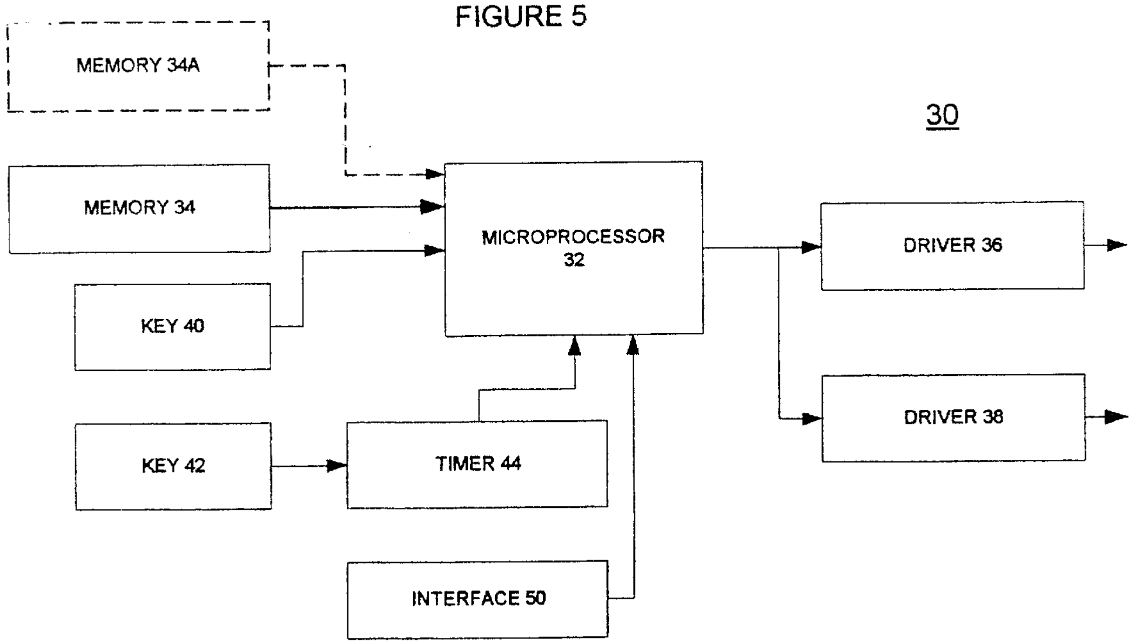
FIG. 4 shows a block diagram of an electronic circuit used to control the images displayed by the picture frame of FIGS. 1–3.

Details of the control circuit are shown in FIG. 4. The control circuit includes a microprocessor 32, a memory 34, and display drivers 36, 38, driver 36 being associated with the main display 20 and driver 38 being associated with the border displays 28. The memory 34 is used to store imaging data and is wired permanently as part of the control circuit. Additional digital data may be provided by a removable memory 34A, which may be, for instance, a flash card (see FIG. 2). The images are stored in memories 34, 34A using an encoding scheme (e.g., MPEG or JPEG) selected to insure that a large number of images can be stored efficiently. The data from memory 34 and/or memory 34A is selectively retrieved by the microprocessor 32 and is used to generate commands to the drivers 36 and 38.

The control circuit of FIG. 4 may also be provided with means for setting and changing operational parameters, such as keys 40 and 42 (see FIG. 2) and a timer 44.

When the displays 20 and 28 are off, the frame 10 can be used in a normal manner by inserting a picture 24 into slot 22, so that it is disposed in the pocket formed between base 12 and border 14. In this configuration, the picture 24 can be viewed through the window defined by the edges 18, and is protected by the cover 19, just like in a standard frame.

The frame can also be used even without a picture by activating the control circuit 30, thereby causing the microprocessor 32 to show an image on the main display 20. In the simplest mode of operation, only a single image is shown on the main display 20.

Figure 5:
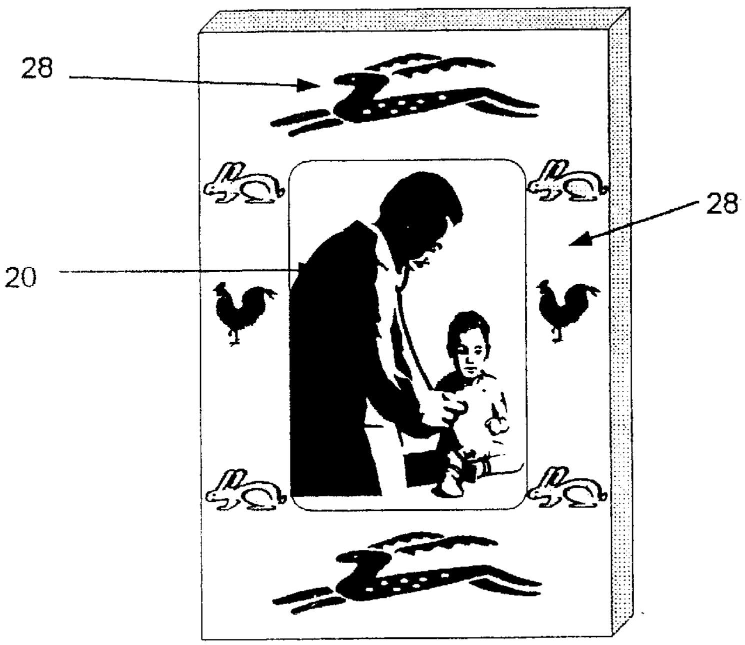
FIG. 5 shows the picture frame of FIGS. 1–4 with a photograph on the main display and images on the border displays.

Alternatively, memory 34 and/or 34A can hold data corresponding to a plurality of images. The circuit 30 may be set, for example, with key 40 to show one image on main display 20. Each time key 40 is activated by a user, another image may be retrieved from memory 34 or 34A and displayed on display 20. Similarly, one or more images may be retrieved and displayed on the border displays 28. FIG. 5 shows the frame 10 with images being displayed on the main display 20 and the border displays 28. If desired, frame 10 can also display images stored in memories 34, 34A in a predetermined sequence to generate a slide show. This mode of operation is initiated by activating key 42. Key 42 in turn activates the timer 44. The timer 44 controls the microprocessor 32 to retrieve successive images from the memory 34 or 34A at regular intervals and to display it on the main display 20. The same or different images may be displayed at regular intervals on the border displays 28 as well.

Flash cards have a large capacity and can store sufficient data for a large number of images to be displayed at a high rate (for example 12–30 images per second). These images can be used to generate a sequence of moving images. Since the total number of images thus stored may be insufficient to generate a lengthy sequence, the microprocessor 32 may be programmed to loop the images so they are played in sequence repeatedly. The sequence of images can be generated on main display 20 or on the border displays 28.

Images may also be loaded into memory 34 from an external source, such as a personal computer. For this purpose, an external interface 50 may be provided which may be, for example, an RS-232 interface, a serial or parallel port, an IR or RF coupler, and so on. A user can generate an image on his computer, or downloaded it, for example from the Internet, and then transmit this image to the microprocessor 32 via interface 50. The interface 50 can then store this image in the memory 34.

Numerous modifications may be made to this invention without departing from its scope as defined in the appended claims.

We claim:

1. A picture frame comprising:

a base having a surface defining a display area;

an electronic display mounted on said surface in said display area;

a control circuit including a memory that stores imaging data, said control circuit generating signals for said electronic display corresponding to said imaging data to generate an image on said electronic display; and an object securing member that cooperates with said base to secure an object over said display area for exhibiting the object wherein said object securing member includes a border attached to said base and cooperating with said base to form a pocket for the object.

2. The picture frame of claim 1 further comprising a border attached to said base, said border forming a window around said display area.

3. The picture frame of claim 1 further comprising a border and a border display attached to said border, said control circuit further generating signals for said border display.

4. The picture frame of claim 3 wherein said control circuit has multiple modes of operation, and further comprises a control key for changing said modes of operation.

5. The picture frame of claim 3 wherein said memory stores imaging data corresponding to a plurality of images, and wherein said control circuit includes a control key for controlling a sequential display of said images on said electronic display.

6. The picture frame of claim 5 wherein said control circuit and said memory cooperate to generate moving images on said electronic display.

7. A picture frame comprising:

a base having a surface defining a display area;

an electronic display mounted on said surface in said display area;

a control circuit including a memory that stores imaging data, said control circuit generating signals for said electronic display corresponding to said imaging data to generate an image on said electronic display; and a border attached to said base, said border forming a window around said display area;

said border cooperating with said base to form a pocket for securing an object over said base.

8. The picture frame of claim 7 wherein said control circuit and said memory cooperate to generate moving images on said electronic display.

9. The picture frame of claim 7 wherein said border includes a plurality of border displays, said control circuit further generating signals for said border displays to form images thereon.

10. A picture frame comprising:

a base;

a border attached to said base and forming a window to define a display area on said base;

an electronic display mounted on one of said base and border; and a control circuit that generates electrical signals for said electronic display to control the display of a preselected image, wherein said base and border cooperate to form a pocket arranged to hold an object to be displayed by said picture frame.

11. The picture frame of claim 10 further comprising a memory that stores digital data defining said preselected image.

12. The picture frame of claim 11 wherein said memory is a removable memory.

13. The picture frame of claim 10 wherein said electronic display is a color LCD device.

14. The picture frame of claim 9 wherein said electronic display is a color light emitting polymer device.

15. The picture frame of claim 14 wherein said memory stores imaging data corresponding to a plurality of images.

16. The picture frame of claim 15 wherein said memory and said control circuit cooperate to generate a sequence of moving images on said electronic display.

17. The picture frame of claim 14 wherein said memory comprises a replaceable memory.

18. The picture frame of claim 1 further comprising an external interface for transferring imaging data to said control circuit from an external source.

19. The picture frame of claim 1 wherein said electronic display is a color light emitting polymer device.

20. The picture frame of claim 7 further comprising an external interface for transferring imaging data to said control circuit from an external source.

21. The picture frame of claim 7 wherein said electronic display is a multi-color light emitting polymer device.

22. The picture frame of claim 10 further comprising an external interface for transferring imaging data to said control circuit from an external source.

23. The picture frame of claim 10 wherein said electronic display is a color light emitting polymer device.

* * * * *